(12) United States Patent
Tschirhart

(10) Patent No.: US 9,762,135 B2
(45) Date of Patent: Sep. 12, 2017

(54) SECONDARY SIDE CONTROL OF RESONANT DC/DC CONVERTERS

(71) Applicant: Infineon Technologies Austria AG, Villach (AT)

(72) Inventor: Darryl Tschirhart, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 40 days.

(21) Appl. No.: 14/533,167

(22) Filed: Nov. 5, 2014

(65) Prior Publication Data

US 2016/0126844 A1  May 5, 2016

(51) Int. Cl.
*H02M 3/335* (2006.01)
*H02M 3/337* (2006.01)
*H02M 1/00* (2006.01)

(52) U.S. Cl.
CPC ....... *H02M 3/337* (2013.01); *H02M 3/33592* (2013.01); *H02M 2001/0058* (2013.01); *Y02B 70/1433* (2013.01); *Y02B 70/1475* (2013.01); *Y02B 70/1491* (2013.01)

(58) Field of Classification Search
CPC ......... H02M 3/33569; H02M 3/33546; H02M 3/33507
USPC .......................................................... 363/17
See application file for complete search history.

(56) References Cited

U.S. PATENT DOCUMENTS

| | | |
|---|---|---|
| 8,724,348 B2 | 5/2014 | Sase et al. |
| 2004/0052100 A1 | 3/2004 | Huang et al. |
| 2009/0038623 A1 | 2/2009 | Farbarik et al. |
| 2013/0058379 A1 | 3/2013 | Kim et al. |
| 2013/0207601 A1 | 8/2013 | Wu et al. |
| 2014/0159646 A1 | 6/2014 | Sankar et al. |

(Continued)

FOREIGN PATENT DOCUMENTS

| | | |
|---|---|---|
| CN | 101911029 A | 12/2010 |
| CN | 102144239 A | 8/2011 |

(Continued)

OTHER PUBLICATIONS

Conesa, et al., "The Serial Resonant Converter with Controlled Rectifier Stage", EUETIB, DEE, Universidad Politecnica de Cataluna, Barcelona, Spain, 2005, 1-10.

(Continued)

*Primary Examiner* — Adolf Berhane
*Assistant Examiner* — Afework Demisse
(74) *Attorney, Agent, or Firm* — Murphy, Bilak & Homiller, PLLC

(57) ABSTRACT

A secondary-side rectification and regulation circuit includes a secondary-side transformer winding, a full-wave rectifier circuit and a control unit. The full-wave rectifier has a first pair of controllable rectifiers including a first transistor connected to a first terminal of the secondary-side transformer winding and a second transistor connected to a second terminal of the secondary-side transformer winding. The control unit is operable to control switching of the transistors of the full-wave rectifier so that the full-wave rectifier (a) generates a rectified output for supplying a load by rectifying current through the secondary-side transformer winding or voltage across the secondary-side transformer winding and (b) regulates the rectified output.

20 Claims, 13 Drawing Sheets

(56) References Cited

U.S. PATENT DOCUMENTS

| | | | |
|---|---|---|---|
| 2014/0334189 A1* | 11/2014 | Yan | H02M 3/33584 363/17 |
| 2014/0347008 A1 | 11/2014 | Chae et al. | |
| 2015/0042274 A1 | 2/2015 | Kim et al. | |
| 2015/0098162 A1 | 4/2015 | Kohout | |
| 2015/0207336 A1 | 7/2015 | Morreale et al. | |

FOREIGN PATENT DOCUMENTS

| | | |
|---|---|---|
| CN | 103580300 A | 2/2014 |
| CN | 103683530 A | 3/2014 |
| JP | 4568783 B2 | 10/2010 |
| JP | 2013524743 A | 6/2013 |
| JP | 2014087134 A | 5/2014 |

OTHER PUBLICATIONS

Kazimierczuk, et al., "Class D Converter with Half-Wave Regulated Synchronous Rectifier", IEEE, Wright State University Department of Electrical Engineering, Dayton, Ohio, 1994, 1005-1011.

Kazimierczuk, et al., "Class D Current-Driven Transformer Center-Tapped Controllable Synchronous Rectifier", IEEE Transactions on Circuit and Systems: Fundamental Theory and Applications, vol. 43, No. 8, Aug. 1996, 670-680.

Pan, et al., "Secondary-Side Adaptive Digital Controlled Series Resonant DC-DC Converters for Low Voltage High Current Applications", IEEE, Department of Electrical and Computer Engineering, Queen's University, Ontario, Canada, 2008, 711-717.

Rosetto, et al., "Series Resonant Converter with Wide Load Range", IEEE, University of Padova, Padova, Italy, 1998, 1326-1331.

Tschirhart, et al., "A Constant Frequency Series-Parallel Resonant Converter with Dual-Edge PWM to Implement Secondary-Side Control", IEEE, Center for Energy for Power Electronics Research, Department of Electrical and Computer Engineering, Queen's University, Kingston, Canada, 2009, 825-832.

Tschirhart, et al., "Secondary-side Control of a Constant Frequency Series Resonant Converter Using Dual-Edge PWM", IEEE, Department of Power Electronics Research, Queen's University, Ontario, Canada, 2010, 544-550.

Unknown, "bq 51221 Dual Mode 5-W (WPC and PMA) Single Chip Wireless Power Receiver", Texas Instruments Incorporated, www.ti.com, Dallas, Texas, Feb. 2014, 1-47.

Unknown, "Industry's First Multi-Mode WPC Compliant Wireless Power Receiver IC", Integrated Device Technology, Inc., IDTP9030, 2013, 1-30.

Unknown, "ORIGA SLE95200 Original Product Authentication and Brand Protection Solution Short Product Information", Infineon Technologies, 81726 Munich, Germany, Feb. 2012, 1-15.

Youssef, et al., "An Advanced Design Solution for the 48V Isolated Voltage Regulator Modules", IEEE ISIE, Montreal, Quebec, Canada, Department of Electrical & Computer Engineering, Queen's University, Jul. 2006, 1036-1041.

Youssef, et al., "Performance and Design of a Novel Constant Frequency 48V Voltage Regulator Module", The 30th Annual Conference of the IEEE Industrial Electronics Society, Busan, Korea, 2004, 313-318.

* cited by examiner

SECONDARY SIDE CONTROL OF RESONANT DC/DC CONVERTERS

TECHNICAL FIELD

The present application relates to resonant DC/DC converters, in particular secondary side control of resonant DC/DC converters.

BACKGROUND

The ability of resonant converters to achieve near lossless switching enables efficient high frequency operation. However, in applications with highly dynamic loads and/or isolation in the feedback path, implementation details practically limit the achievable frequency. For the case of isolated topologies, an optocoupler is used to provide isolation between the sensed output (voltage or current) of the secondary side and the controller on the primary. The controller of the resonant converter responds to the demands of the output to maintain regulation by adjusting the control variable of the primary side devices. Optocouplers are slow devices that limit the achievable bandwidth of the control loop. This contradicts one of the benefits of high frequency operation being the ability to increase loop bandwidth. Even in non-isolated applications, the feedback loop acts at the frequency of the primary side devices. With secondary side control, the loop operates on each half cycle of the switching period thereby effectively halving the response time. Further, certain resonant converters suffer from poor performance when subject to wide load variation. For example, the series resonant converter loses regulation at no-load under traditional variable frequency (VF) control. Secondary-side control can overcome this.

One secondary-side control technique is controlling the amount of resonant energy transmitted to the load. One conventional approach involves introducing a phase-shift to the gate signals of synchronous rectifiers in a center-tap secondary transformer system. However this approach allows reverse current to flow in the rectifiers, causing increased voltage ripple at the output. Another conventional approach involves using a full-bridge rectifier configuration for a single-winding secondary transformer. Two rectifiers are simple diodes, and the other two rectifiers are synchronous (controllable) rectifiers. However with this approach, at least one diode is always in the rectification path, limiting the achievable efficiency at full-load.

Another secondary-side control technique is exploiting the conduction difference of the MOSFET channel of the synchronous rectifier and intrinsic body diode. One conventional approach involves using a single modulation scheme, which has lower transient performance than a dual-edge modulation scheme. Another conventional approach involves using a dual-edge modulation scheme which results in the fastest achievable response. However, the control is course as there is only the option of one or two resistive drops or one or two diode drops for full-bridge and center-tap rectifiers, respectively.

SUMMARY

According to an embodiment of a secondary-side rectification and regulation circuit, the secondary-side rectification and regulation circuit comprises a secondary-side transformer winding, a full-wave rectifier having a first pair of controllable rectifiers comprising a first transistor connected to a first terminal of the secondary-side transformer winding and a second transistor connected to a second terminal of the secondary-side transformer winding, and a control unit. The control unit is operable to control switching of the transistors of the full-wave rectifier so that the full-wave rectifier (a) generates a rectified output for supplying a load by rectifying current through the secondary-side transformer winding or voltage across the secondary-side transformer winding and (b) regulates the rectified output.

A corresponding method of rectification and regulation using the secondary-side rectification and regulation circuit comprises: switching the transistors of the full-wave rectifier so that the full-wave rectifier generates a rectified output for supplying the load by rectifying current through the secondary-side transformer winding or voltage across the secondary-side transformer winding; and switching the transistors of the full-wave rectifier to regulate the rectified output.

According to an embodiment of an electronic system, the electronic system comprises a load, a secondary-side transformer winding, a full-wave rectifier coupling the secondary-side transformer winding to the load and comprising a first pair of controllable rectifiers including a first transistor connected to a first terminal of the secondary-side transformer winding and a second transistor connected to a second terminal of the secondary-side transformer winding, and a control unit. The control unit is operable to control switching of the transistors of the full-wave rectifier so that the full-wave rectifier (a) generates a rectified output for supplying the load by rectifying current through the secondary-side transformer winding or voltage across the secondary-side transformer winding and (b) regulates the rectified output.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein use secondary-side control for supplying a load. The granularity of the techniques described herein is finer and can be two resistive drops, one resistive and one diode drop, or two diode drops in the case of a full-bridge rectifier. The rectification and regulation circuit described herein includes a transformer winding, a full-wave rectifier and a control unit. The full-wave rectifier has a first pair of controllable rectifiers comprising a first transistor connected to a first terminal of the transformer winding and a second transistor connected to a second terminal of the transformer winding. The full-wave rectifier can have only the first pair of controllable rectifiers or also a second pair of controllable rectifiers, depending on whether a center tap configuration is used as explained in greater detail later herein. In either case, the control unit is operable to control switching of the transistors of the full-wave rectifier so that the full-wave rectifier (a) generates a rectified output for supplying a load by rectifying current through the transformer winding or voltage across the transformer winding and (b) regulates the rectified output. As such, an additional regulation stage such as a non-isolated dc/dc converter, or feedback to the controller on the primary-side is not necessary as the transistors of the full-wave rectifier are controlled to provide both rectification and regulation to the load. Thus, only one conversion stage is used in the secondary-side rectification and regulation circuit, thereby promoting high efficiency and reducing size and cost.

Figure 1:
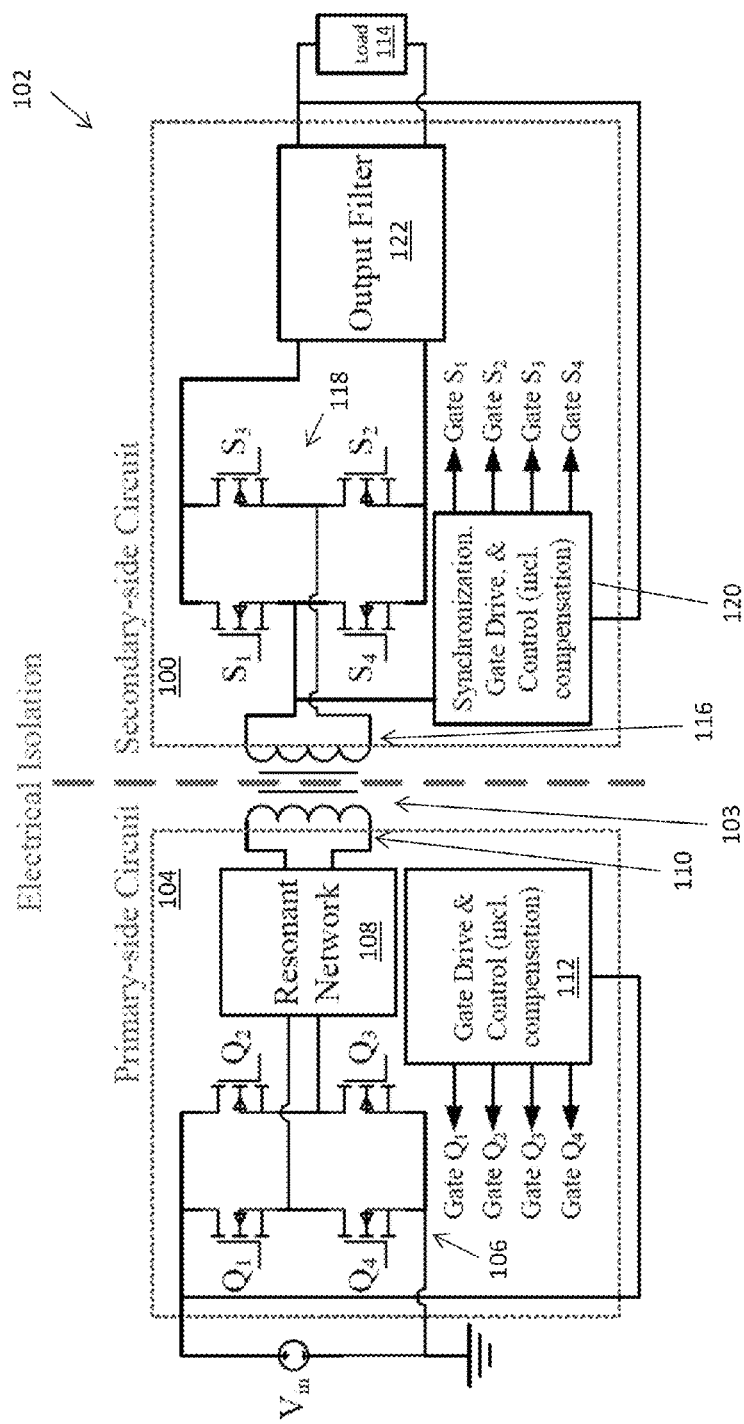
FIG. 1 illustrates a block diagram of an embodiment of an electronic system including a secondary-side rectification and regulation circuit for supplying a load.

FIG. 1 illustrates one embodiment of the rectification and regulation circuit 100 and an electronic system 102 including the rectification and regulation (secondary-side) circuit 100 and a primary-side circuit 104. The primary-side circuit 104 is coupled to the rectification and regulation circuit 100 by a transformer 103. The transformer 103 provides isolation and/or a voltage conversion ratio. The primary-side circuit 104 includes a chopper circuit 106 that is either a full-bridge or half-bridge configuration, a resonant network 108 having some configuration of inductors and capacitors, the primary winding 110 of the transformer 103, and a control unit 112 for controlling operation of the chopper circuit 106 and communicating with the rectification and regulation (secondary-side) circuit. For example, the primary-side control unit 112 adjusts the frequency or other control variable of transistors $Q_1$ through $Q_4$ of the chopper circuit 106. The chopper circuit 106 of the primary-side circuit 104 has a full-bridge configuration in FIG. 1, comprising transistors $Q_1$, $Q_2$, $Q_3$, and $Q_4$. The primary-side control unit 112 generates gate signals ("Gate $Q_1$", "Gate $Q_2$", etc.) for switching the transistors of the chopper circuit 106. The DC input (Vin) to the primary-side circuit 104 is illustrated as a DC source, which can be derived by multiple conversion stages from the ac mains.

The rectification and regulation (secondary-side) circuit 100 of the electronic system 102 includes the secondary winding 116 of a transformer 103, a full-wave rectifier 118 and a control unit 120. According to this embodiment, the full-wave rectifier 118 has two pairs of controllable rectifiers. The first pair of controllable rectifiers comprises a first transistor ($S_1$) connected to a first terminal of the secondary transformer winding 116 and a second transistor ($S_2$) connected to a second terminal of the transformer winding 116. The second pair of controllable rectifiers comprises a third transistor ($S_3$) connected to the second terminal of the secondary transformer winding 116 and a fourth transistor ($S_4$) connected to the first terminal of the transformer winding 116. The transistors of the full-wave rectifier 118 are operated as controlled rectifiers and therefore can be any standard transistor type suitable for use as a synchronous rectifier such as FETs (field effect transistors), IGBTs (insulated gate bipolar transistors), etc., where the switching state of the transistors determines whether the transistors are configured as diodes or for rectifying low ac current with a small voltage drop. The secondary-side control unit 120 generates respective gate signals ("Gate $S_1$", "Gate $S_2$", etc.) to control switching of the rectifier transistors so that the full-wave rectifier 118 (a) generates a rectified output for supplying the load 114 of the electronic system 102, by rectifying current through the secondary transformer winding 116 or voltage across the transformer winding 116 and (b) regulates the rectified output. The load 114 can be an electronic device such as a CPU (central processing unit), GPU (graphics processing unit), memory (e.g. 48V/1V using a resonant converter), or the load 114 can be another converter e.g. to implement a 400V/48V converter or 400V/12V converter for a server.

According to the embodiment of FIG. 1, the secondary-side control unit 120 uses alternate edge-modulation for switching the transistors of the full-wave rectifier 118 to increase the range of controllability. The alternate edge-modulation technique can be applied to voltage-type or current-type resonant topologies. The designation of voltage-type or current-type identifies the sinusoidal waveform responsible for transferring power.

Figure 2:
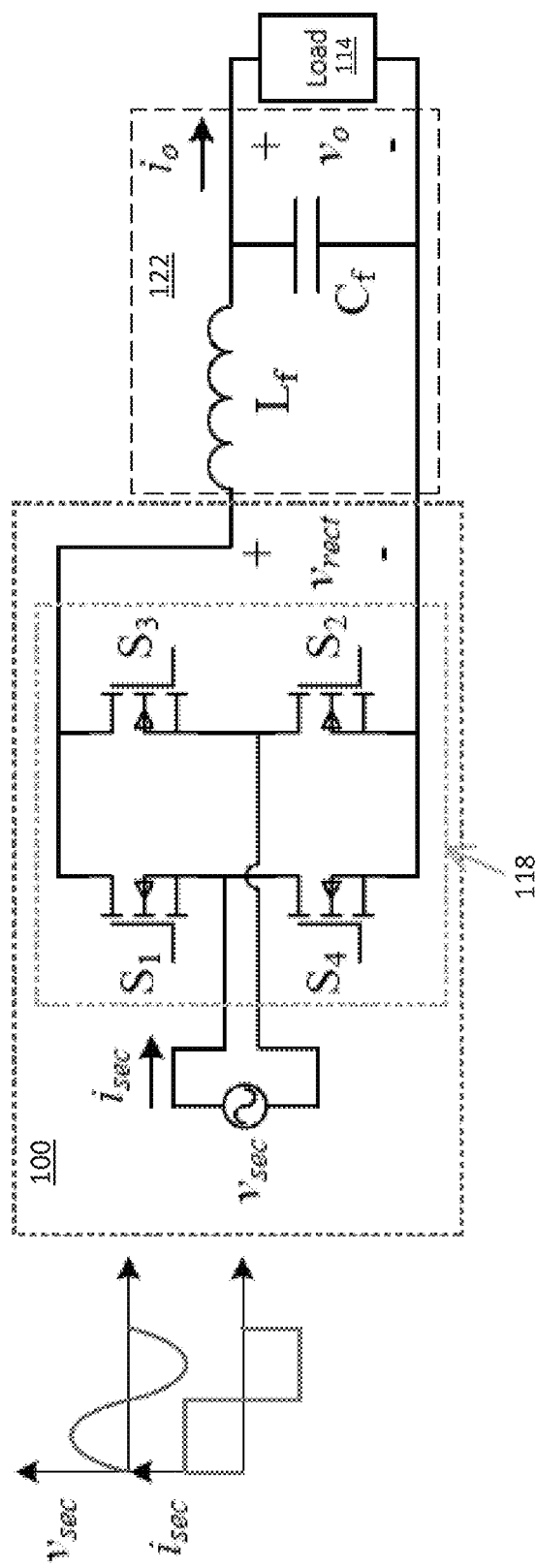
FIG. 2 illustrates a block diagram of an embodiment of the secondary-side rectification and regulation circuit of FIG. 1 implemented as a voltage-type resonant converter.

FIG. 2 shows the rectification and regulation (secondary-side) circuit 100 and corresponding filter 122 of the electronic system 102 of FIG. 1, implemented as a voltage-type resonant converter where $V_{sec}$ is the time-varying voltage across the terminals of the secondary transformer winding 116 and $i_{sec}$ is the corresponding current in the transformer winding 116. The filter 122 is shown as a low-pass filter comprising an inductor ($L_f$) and capacitor ($C_f$) for coupling the voltage-type resonant converter 100 to the load 114. Operation of the voltage-type resonant converter 100 shown in FIG. 2 is explained next in further detail with reference to FIG. 3.

Figure 3:
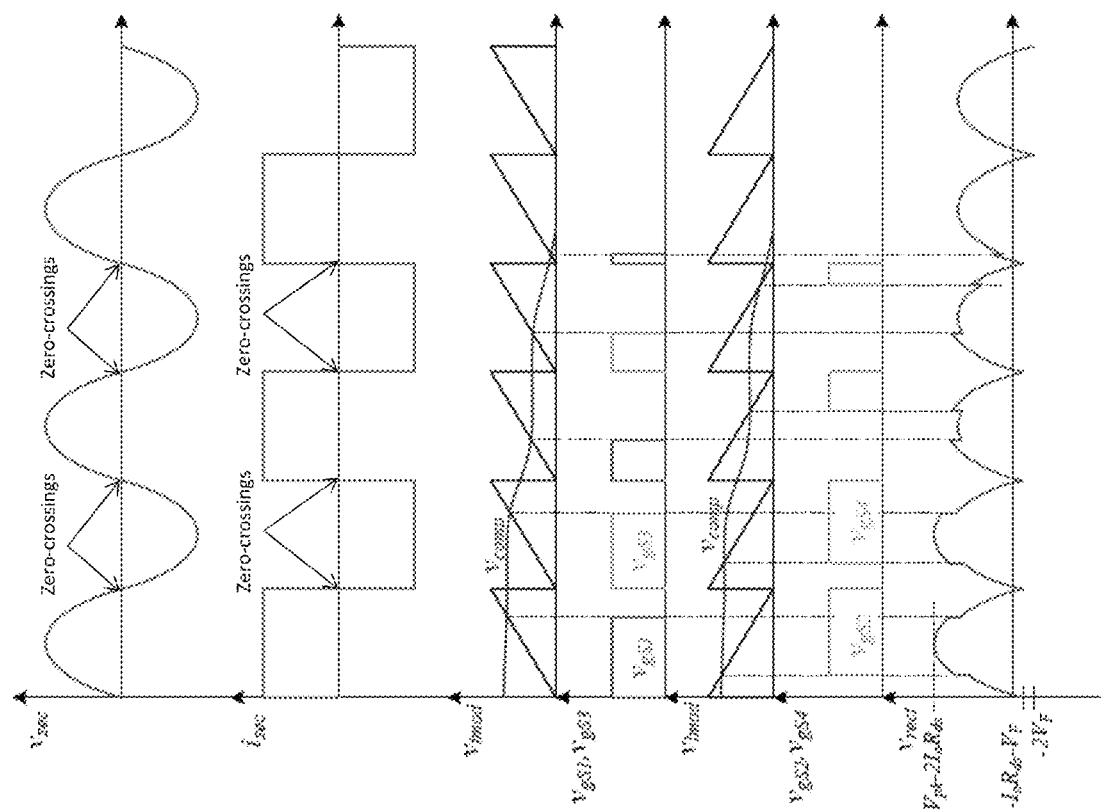
FIG. 3 illustrates various waveforms associated with operating the secondary-side rectification and regulation circuit of FIG. 2 using alternate-edge modulation to achieve rectification and regulation.

FIG. 3 illustrate various waveforms associated with the operation of the voltage-type resonant converter 100 of FIG. 2, where $V_{comp}$ is a compensated error signal present in any linear control network. The secondary-side control unit 120 uses trailing-edge modulation for switching transistors $S_1$ and $S_3$ of the full-wave rectifier 118 and leading-edge modulation for switching transistors $S_2$ and $S_4$ of the rectifier 118. In one embodiment, the secondary-side control unit 120 switches the first and third rectifier transistors $S_1$, $S_3$ based on a trailing-edge PWM (pulse width modulation) signal ($V_{tmod}$) which is synced to the resonant current or voltage waveform ($i_{sec}$ or $V_{sec}$) for the secondary transformer winding 116. The secondary-side control unit 120 also switches the second and fourth rectifier transistors S2, S4 based on a leading-edge PWM signal ($V_{lmod}$) which is also synced to the resonant waveform. The trailing-edge and leading-edge PWM signals $V_{tmod}$, $V_{lmod}$ each go to (i.e. approach) zero at zero-crossing points of the resonant waveform.

The secondary-side control unit 120 turns off the first rectifier transistor $S_1$ if the first transistor $S_1$ is on or turns off the third rectifier transistor $S_3$ if the third transistor $S_3$ is on, responsive to the trailing-edge PWM signal $V_{tmod}$ rising above the compensated error signal $V_{comp}$. The secondary-side control unit 120 similarly turns on the second rectifier transistor $S_2$ if the second transistor $S_2$ is off or turns on the fourth rectifier transistor $S_4$ if the fourth transistor $S_4$ is off, responsive to the leading-edge PWM signal $V_{lmod}$ falling below the error signal $V_{comp}$. The gate voltages of the rectifier transistors are labelled $V_{gS1}$, $V_{gS2}$, $V_{gS3}$, and $V_{gS4}$, in FIG. 4, respectively, the levels of which correspond to the respective gate signals ("Gate $S_1$", "Gate $S_2$", etc.) generated by the secondary-side control unit 120 as shown in FIG. 1. The rectification and regulation behaviour of the full-wave rectifier 118 is identical if the modulation scheme is switched i.e. leading-edge modulation is used for rectifier transistors $S_1$ and $S_3$ and trailing-edge modulation is used for rectifier transistors $S_2$ and $S_4$.

In either case, when the transistors of the full-wave rectifier 118 are operated in an open-loop manner, the rectified voltage ($V_{rect}$) corresponds to the rectified transformer winding voltage reduced by two resistive drops (2IoRds) of the transistors i.e. Vrect=|$V_{sec}$|−2IoRds where Io is the transistor output current (e.g. drain current of an FET) and Rds is the transistor on-state resistance (e.g. the drain-to-source resistance of an FET). Under alternating edge modulation, there are three possible rectifier voltage drops: (1) 2IoRds; (2) $V_F$+IoRds; or (3) 2$V_F$ where $V_F$ is the forward voltage of the transistor body diodes. The body diodes do not conduct at full-load. As the load reduces, the body diodes are allowed to conduct a greater portion of the cycle, thus enabling the full-wave rectifier 118 to perform both rectification and regulation in a single voltage-type resonant converter stage.

In more detail, the output voltage of the voltage-type resonant converter 100 shown in FIG. 2 is calculated as given by:

$$V_o = \frac{1}{T_{sw}} \int_0^{T_{sw}} v_{rect}(t) dt \quad (1)$$

Using the ratios $$\gamma = \frac{V_F}{V_o} \text{ and } \lambda = \frac{R_{ds}}{R_L},$$

the steady-state fundamental ac voltage across the primary transformer winding 110 is given by:

$$V_{ac,rms} = \frac{\pi N V_o}{2\sqrt{2}} \beta \quad (2)$$

where $D_{SR}$ is the duty cycle of the transistors operating as synchronous rectifiers and is equal to the ratio of $V_{comp}$ to the magnitude of the modulators ($V_{tmod}$=$V_{lmod}$). N is the turns ratio of the primary transformer winding 110 to secondary transformer winding 116. The conversion factor β is given by:

$$\beta = 1 + \gamma(1-D_{SR}) + \lambda D_{SR} \quad (3)$$

From equations (1)-(3), adjusting the conduction of the rectifier transistors changes the voltage at the primary transformer winding 110 which implies changing the transfer characteristics of the resonant tank. Thus load regulation is achieved by the alternate edge-modulation of the full-wave rectifier transistors at the rectification and regulation (secondary-side) circuit 100.

Figure 4:
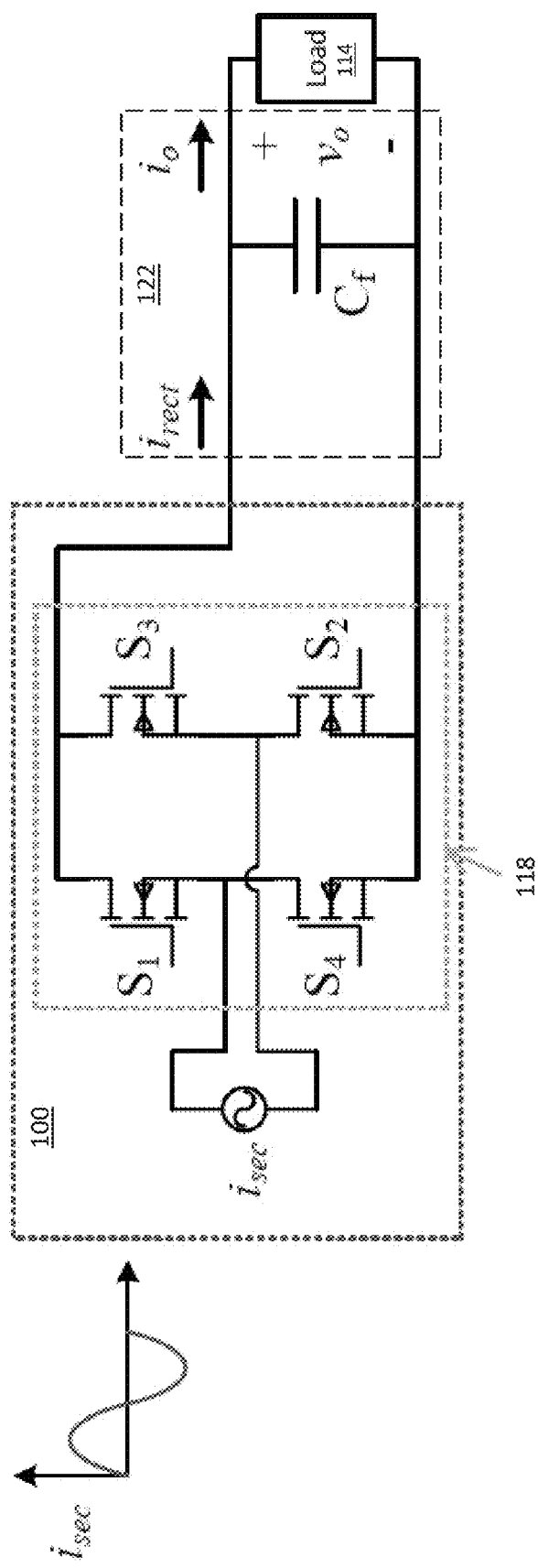
FIG. 4 illustrates a block diagram of an embodiment of the secondary-side rectification and regulation circuit of FIG. 1 implemented as a current-type resonant converter.

FIG. 4 shows the rectification and regulation (secondary-side) circuit 100 and corresponding filter 122 of the electronic system 102 of FIG. 1, implemented as a current-type resonant network, where $i_{sec}$ is the time-varying current in the secondary transformer winding 116. The filter 122 is implemented as a capacitor ($C_f$) for coupling the current-type resonant power converter 100 to the load 114. Operation of the rectification and regulation (secondary-side) circuit 100 shown in FIG. 4 is explained next in further detail with reference to FIG. 5.

Figure 5:
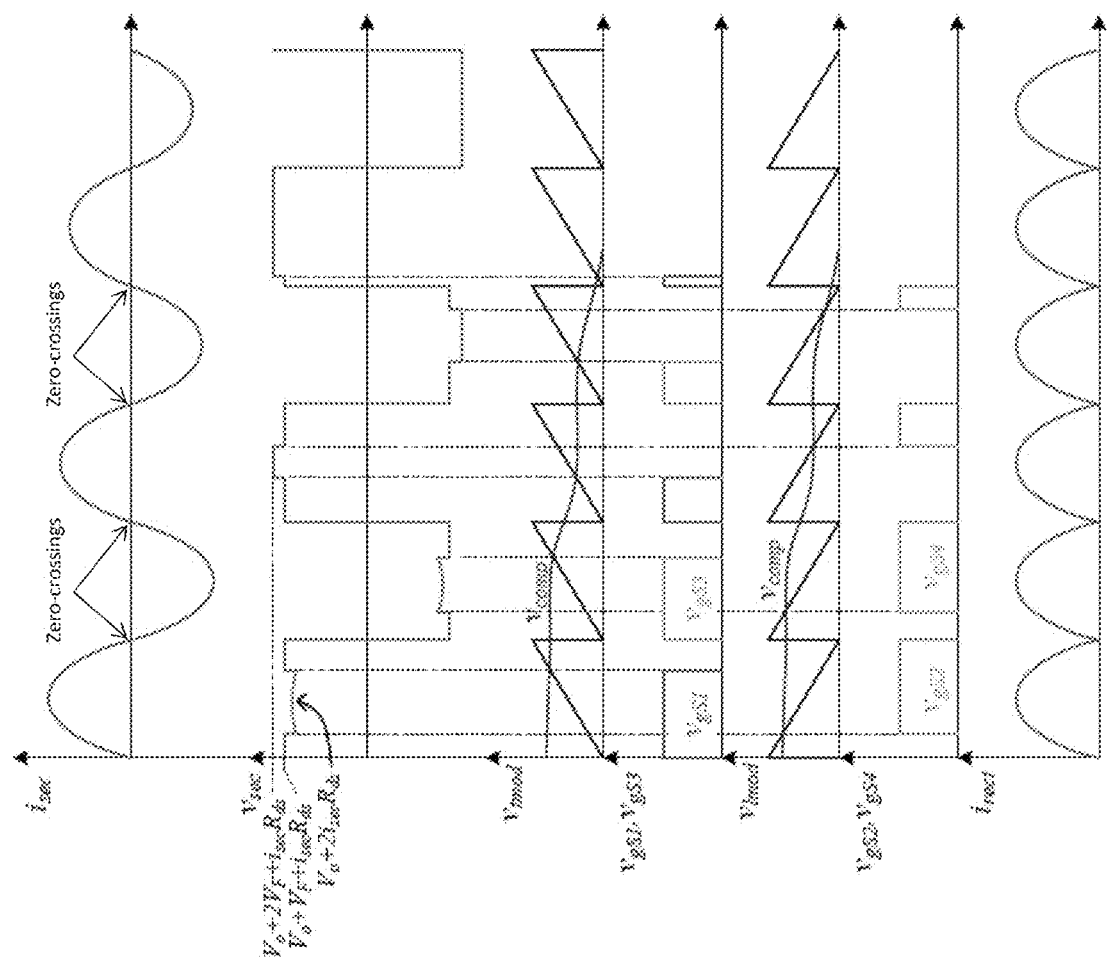
FIG. 5 illustrates various waveforms associated with operating the secondary-side rectification and regulation circuit of FIG. 4 using alternate-edge modulation to achieve rectification and regulation.

FIG. 5 illustrate various waveforms associated with the operation of the current-type resonant power converter 100 of FIG. 4, where $V_{comp}$ again represents a compensated error signal present in a linear control network. From the transformer winding and rectified current waveforms $i_{sec}$ and $i_{rect}$, it can be seen that adjustment of the duty cycle $D_{SR}$ impacts the transfer characteristics of the resonant tank. Maximum power is transferred when the transistor channels of the full-wave rectifier 118 conduct 100% of the cycle, while the transfer is at a minimum when the rectifier transistors never conduct.

As previously explained herein, the control unit 120 of the rectification and regulation (secondary-side) circuit 100 turns off the first rectifier transistor $S_1$ (i.e. $V_{gS1}$=0) if the first transistor $S_1$ is on or turns off the third rectifier transistor $S_3$ (i.e. $V_{gS3}$=0) if the third transistor $S_3$ is on responsive to the trailing-edge PWM signal $V_{tmod}$ rising above the compensated error signal $V_{comp}$. The secondary-side control unit 120 similarly turns on the second rectifier transistor $S_2$ (i.e. $V_{gS2}$=1) if the second transistor $S_2$ is off or turns on the fourth rectifier transistor $S_4$ (i.e. $V_{gS4}$=1) if the fourth transistor $S_4$ is off, responsive to the leading-edge PWM signal $V_{lmod}$ falling below the error signal $V_{comp}$. The gate voltage levels of the rectifier transistors $V_{gS1}$, $V_{gS2}$, $V_{gS3}$, and $V_{gS4}$ in FIG. 5 correspond to the respective gate signals ("Gate $S_1$", "Gate $S_2$", etc.) generated by the secondary-side control unit 120 as shown in FIG. 1. Again, the rectification and regulation behaviour of the full-wave rectifier 118 is identical if the modulation scheme is switched as previously explained herein. In either case and under alternating edge modulation, there are three possible rectifier voltage drops: (1) 2$i_{sec}$Rds; (2) $V_F$+$i_{sec}$Rds; or (3) 2$V_F$ where $V_F$ is the forward voltage of the transistor body diodes. As the load reduces, the body diodes are allowed to conduct a greater portion of the cycle, thus enabling the full-wave rectifier 118 to perform both rectification and regulation in a single current-type resonant power converter stage.

Figure 6:
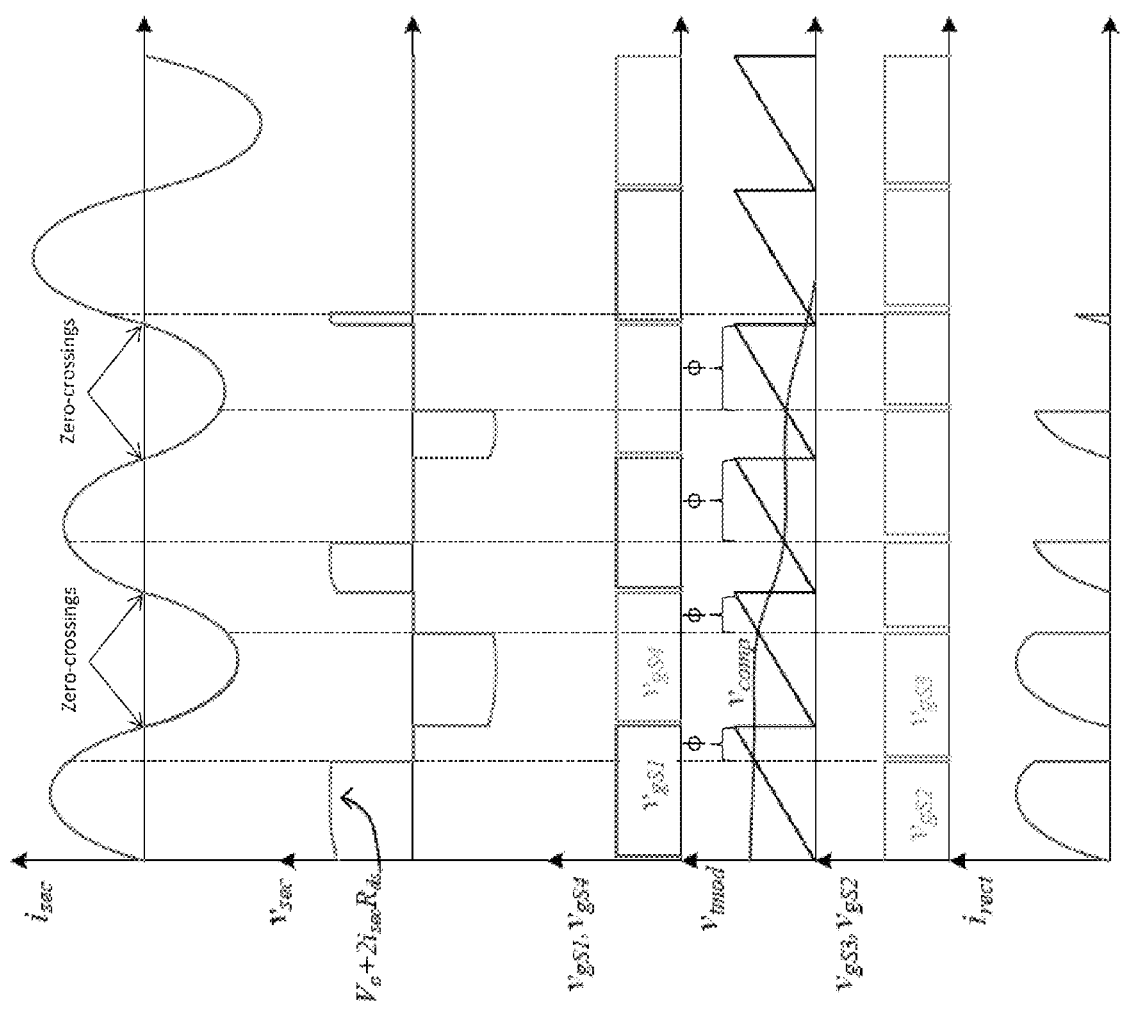
FIG. 6 illustrates various waveforms associated with operating the secondary-side rectification and regulation circuit of FIG. 4 using phase-shift modulation with trailing-edge modulation to achieve rectification and regulation.

FIG. 6 illustrate various waveforms associated with the operation of the current-type resonant rectification and regulation (secondary-side) circuit 100 of FIG. 4, based on a phase-shift modulation (PSM) scheme. According to this embodiment, the control unit 120 of the rectification and regulation (secondary-side) circuit 100 switches the transistors of each pair of controllable rectifiers in a complementary fashion with approximately 50% duty cycle. The secondary-side control unit 120 also introduces a phase shift ($\phi$) between the pairs of controllable rectifiers. The resulting waveforms shown in FIG. 6 use trailing-edge modulation (standard phase-shift modulation technique) to generate the phase shift.

Figure 7:
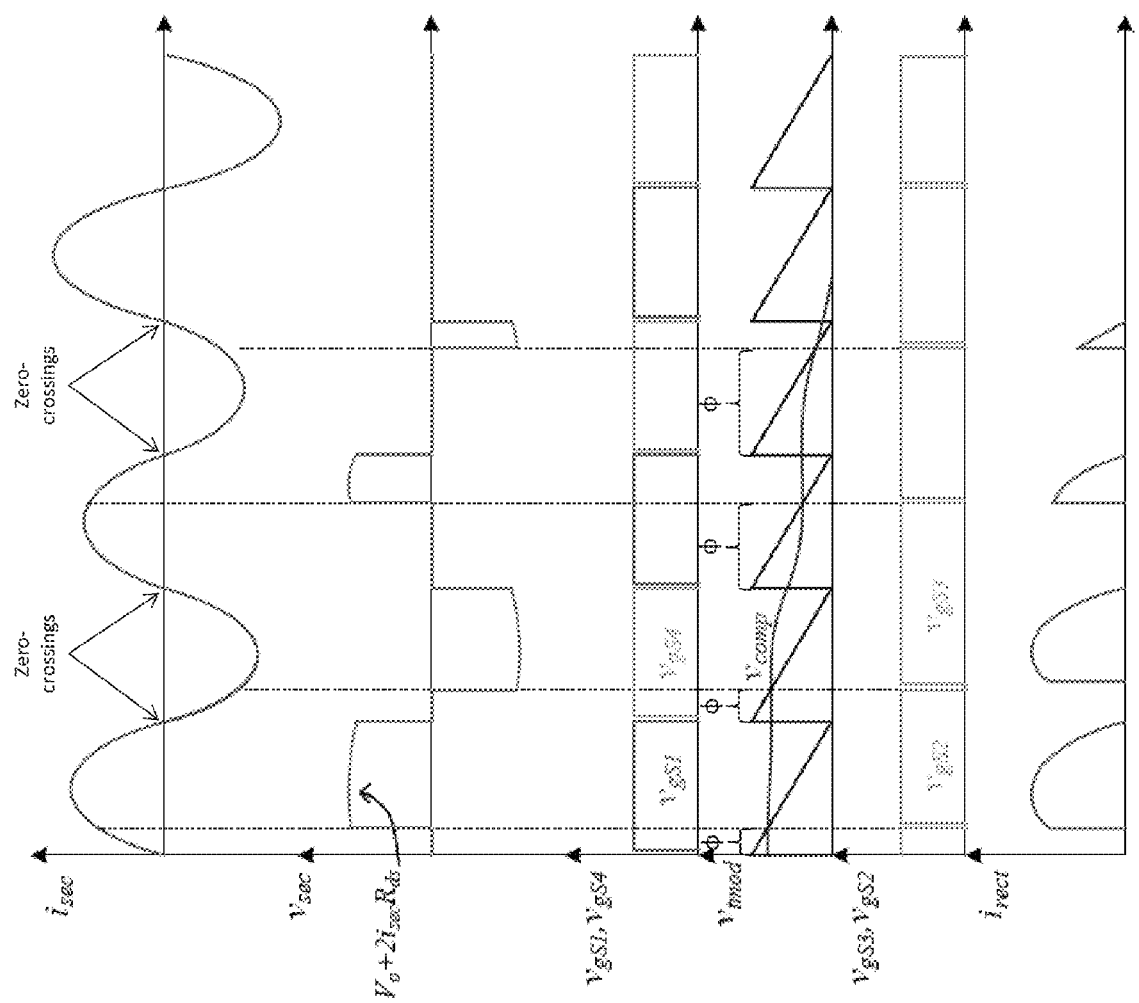
FIG. 7 illustrates various waveforms associated with operating the secondary-side rectification and regulation circuit of FIG. 4 using phase-shift modulation with leading-edge modulation to achieve rectification and regulation.
Figure 8:
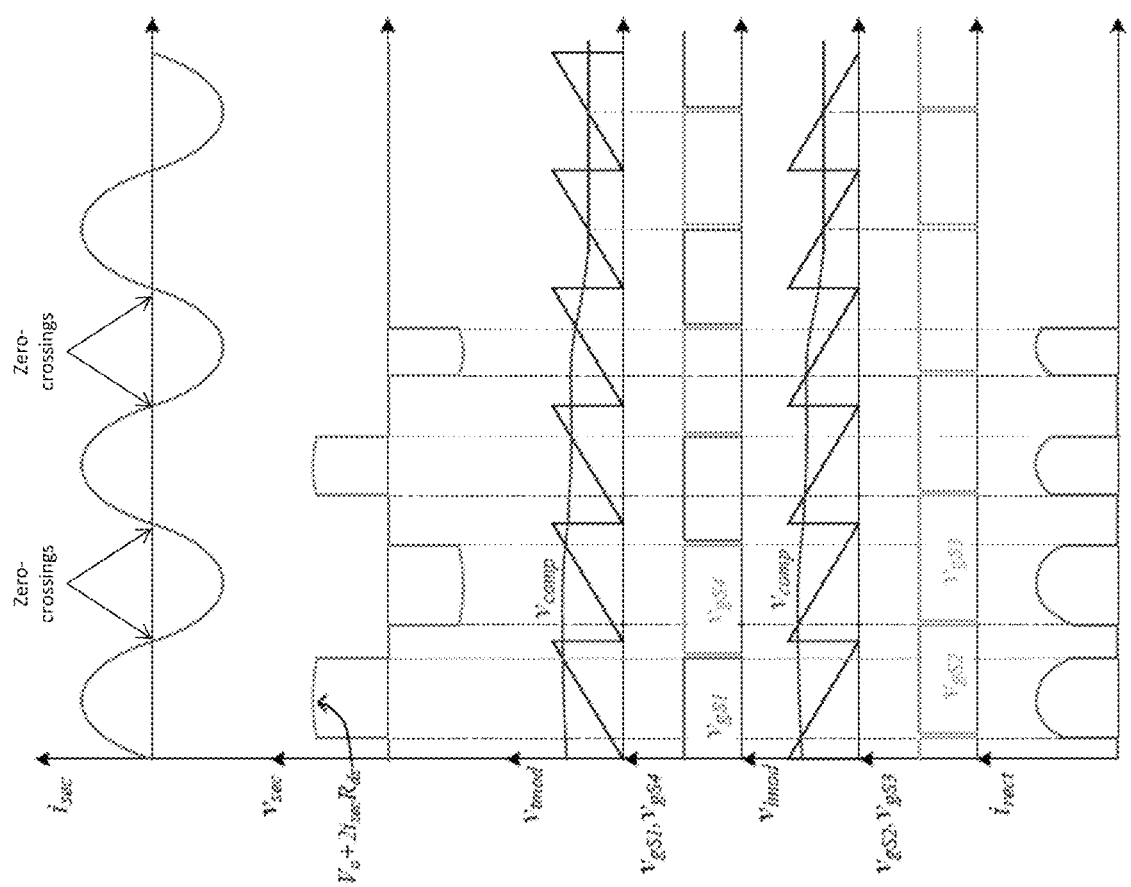
FIG. 8 illustrates various waveforms associated with operating the secondary-side rectification and regulation circuit of FIG. 4 using phase-shift modulation with alternate-edge modulation to achieve rectification and regulation.

When adjacent rectifier transistors ($S_1$ and $S_3$ or $S_2$ and $S_4$) are switched on by the secondary-side control unit 120, resonant current circulates instead of being sent to the load 114 and without a large output voltage ripple. With trailing-edge modulation, the rectified current waveform ($i_{rect}$) starts at the zero crossing that begins the half cycle, and then cuts out before the end of the half cycle. If leading-edge modulation is used instead, the rectified current waveform would start sometime after the zero-crossing that starts the half cycle, and then end at the zero-crossing at the end of the half cycle, as illustrated in FIG. 7. The rectified current waveform can be centered at the peak of the rectified transformer winding current ($i_{sec}$) if alternating edge modulation is used to generate the phase shift, as illustrated in FIG. 8. For example, the secondary-side control unit 120 can use trailing-edge modulation for switching the first and fourth rectifier transistors ($S_1$ and $S_4$) and leading-edge modulation for switching the second and third rectifier transistors ($S_2$ and $S_3$) to introduce the phase shift ($\phi$) between the pairs of controllable rectifiers. In each case, the current ($i_{rect}$) output by the full-wave rectifier 118 is both rectified and regulated as shown in FIG. 6.

According to the embodiments previously described, PWM-based alternate-edge modulation is used to produce the waveforms in FIGS. 3 and 5, where top transistors $S_1$ and $S_3$ of the full-wave rectifier 118 are controlled with one modulation scheme and the bottom rectifier transistors $S_2$ and $S_4$ are controlled with the opposite scheme. However, the rectifier transistors for a current-type resonant converter can be switched using phase shift modulation (PSM) to achieve single-stage rectification and regulation. As described above for trailing edge modulation and as shown in FIG. 6, rectifier transistors $S_1$ and $S_4$ operate each at 50% duty cycle and are locked in phase to the transformer winding current waveform ($i_{sec}$). Rectifier transistors $S_2$ and $S_3$ are switched complementary with 50% duty cycle in steady state. The phase shift of rectifier transistors $S_2$ and $S_3$ with respect to rectifier transistors $S_1$ and $S_4$ is determined by the compensated error voltage $V_{comp}$. This is standard PSM (phase shift modulation) applied to the transistors of a full-wave rectifier 118 of a resonant converter for providing regulation.

FIG. 7 illustrate various waveforms associated with the operation of the current-type resonant rectification and regulation (secondary-side) circuit 100 of FIG. 4, based on a PSM scheme that uses leading-edge modulation instead of trailing-edge modulation to control switching of the rectifier transistors. As can be seen in FIG. 7, the secondary-side control unit 120 switches the first and fourth rectifier transistors $S_1$, $S_4$ at approximately 50% duty cycle based on a leading-edge PWM signal ($V_{lmod}$) that is locked in phase to the transformer winding current waveform ($i_{sec}$). Rectifier transistors $S_2$ and $S_3$ are switched complementary with 50% duty cycle in steady state and the phase shift ($\phi$) of transistors $S_2$ and $S_3$ with respect to transistors $S_1$ and $S_4$ is again determined by the compensated error voltage $V_{comp}$ as shown in FIG. 7.

FIG. 8 illustrate various waveforms associated with the operation of the current-type resonant rectification and regulation (secondary-side) circuit 100 of FIG. 4, based on a phase-shift modulation scheme that uses alternate-edge modulation to control switching of the rectifier transistors. The alternate-edge modulation provides PSM rectification, but each modulation scheme (leading-edge and trailing-edge) is responsible for the top and bottom transistors ($S_1/S_4$ or $S_2/S_3$) of the full-wave rectifier 118. More specifically, the secondary-side control unit 120 generates a trailing-edge PWM signal ($V_{tmod}$) that is locked in phase to the transformer winding current waveform ($i_{sec}$) for switching the first and fourth rectifier transistors $S_1$, $S_4$ at approximately 50% duty cycle. The secondary-side control unit 120 also generates a leading-edge PWM signal ($V_{lmod}$) that is in phase with the transformer winding current waveform ($i_{sec}$) for switching the second and third rectifier transistors $S_2$, $S_3$ also at approximately 50% duty cycle. Similar to the leading-edge and trailing-edge PSM embodiments described above, the phase shift ($\phi$) of rectifier transistors $S_2$ and $S_3$ with respect to rectifier transistors $S_1$ and $S_4$ is determined by the compensated error voltage $V_{comp}$ as shown in FIG. 8. In one embodiment, $V_{comp}$ is limited e.g. to half the modulation voltage so that charge is not removed from the filter capacitor ($C_1$) and output ripple does not increase.

A key difference between PSM for rectification compared to PWM is current only flows to the filter 122 when opposite switches of the full-wave rectifier 118 are on (e.g. $S_1$ and $S_3$, or $S_2$ and $S_4$). Otherwise, the current circulates. PWM-based switching control exploits the conduction difference of an FET and diode. PSM-based switching control achieves regulation by controlling the amount of current delivered to the load 114, and is applicable only to current-type resonant converters.

Figure 9:
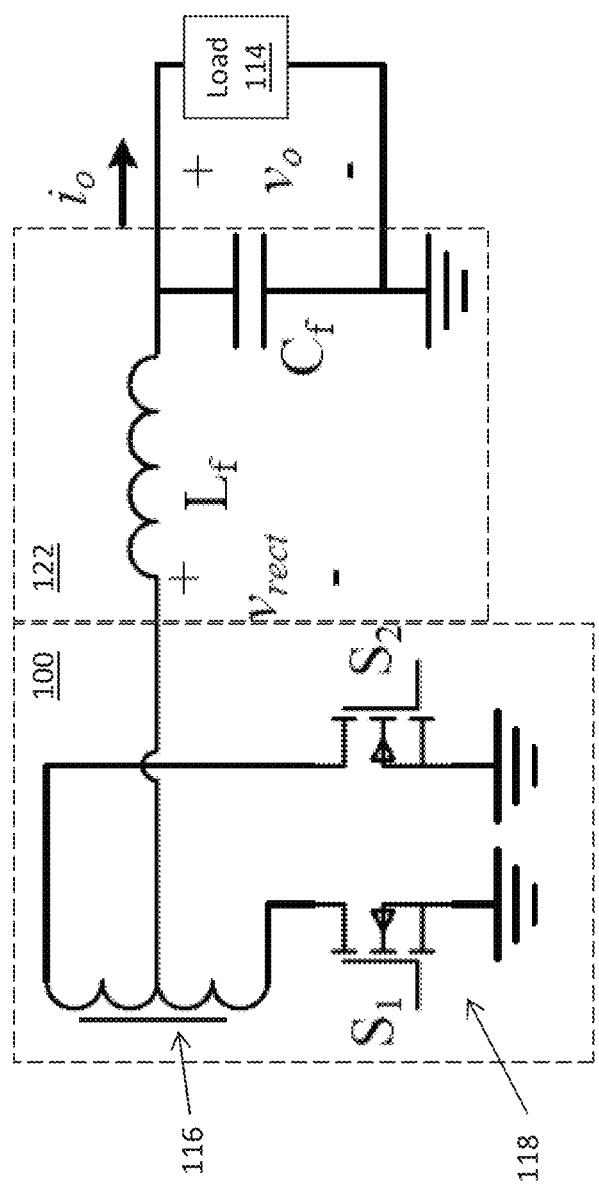
FIG. 9 illustrates a block diagram of another embodiment of the secondary-side rectification and regulation circuit of FIG. 1 implemented with only one pair of controllable rectifiers and a center tap configuration.

FIG. 9 illustrates another embodiment of the rectification and regulation (secondary-side) circuit 100. The embodiment shown in FIG. 9 is similar to the embodiment shown in FIG. 1, however, the full-wave rectifier 118 has only one pair of controllable rectifiers comprising transistors $S_1$ and $S_2$ and a center tap between the first and second terminals of the secondary transformer winding 116. Transistors $S_1$ and $S_2$ rectify the voltage or current signal ($V_{sec}$ or $i_{sec}$) for each respective half cycle based on the compensated error voltage $V_{comp}$. When the rectifier transistors are switched on, an IR drop is experienced across the devices, making the rectified voltage Vrect=$|V_{sec}|$−loRds where loRds is the IR drop for an FET. When the rectifier transistors are switched off, the rectified voltage is Vrect=$|V_{sec}|$−$V_F$ where $V_F$ is the forward voltage of the transistor body diodes. The technique can be applied to current-type topologies and the corresponding waveforms would then resemble FIG. 5 where the transformer winding voltage is distorted by a single IR or $V_F$ voltage.

Figure 10:
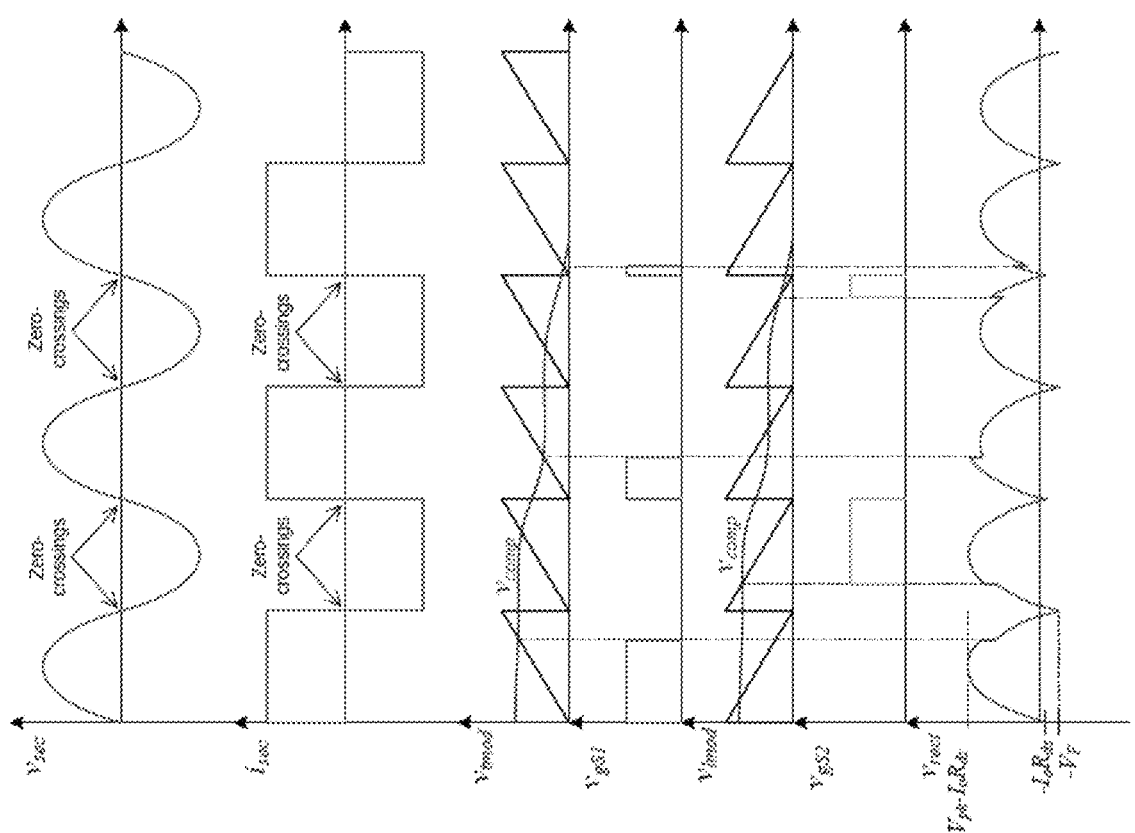
FIG. 10 illustrates various waveforms associated with operating the secondary-side rectification and regulation circuit of FIG. 9 using alternate-edge modulation to achieve rectification and regulation.

FIG. 10 illustrate various waveforms associated with the operation of the rectification and regulation (secondary-side) circuit 100 of FIG. 9. During operation, the secondary-side control unit 120 (not shown in FIG. 9) switches the first rectifier transistor $S_1$ based on a trailing-edge PWM signal $V_{tmod}$ synced to the resonant current or voltage waveform ($i_{sec}$ or $V_{sec}$) for the secondary transformer winding 116 and switches the second rectifier transistor $S_2$ based on a leading-edge PWM signal $V_{lmod}$ also synced to the resonant waveform. The trailing-edge and leading-edge PWM signals each go to (approach) zero at zero-crossing points of the resonant waveform as previously described herein. The secondary-side control unit 120 turns off the first rectifier transistor $S_1$ if the first transistor $S_1$ is on responsive to the trailing-edge PWM signal $V_{tmod}$ rising above the compensated error voltage $V_{comp}$. The secondary-side control unit 120 turns on the second rectifier transistor $S_2$ if the first and second transistors $S_1$ and $S_2$ are both off responsive to the leading-edge PWM signal $V_{lmod}$ falling below the error signal $V_{comp}$.

In both the voltage-type and current-type resonant converter embodiments previously described herein, the rectification and regulation (secondary-side) circuit 100 measures, detects, estimates, or otherwise identifies the zero-crossing points in the resonant waveform ($V_{sec}$ for voltage-type resonant network and $i_{sec}$ for current-type) in order to implement the single-stage rectification and regulation modulation schemes previously described herein. Voltage sense circuits for sensing $V_{sec}$ are straightforward and well known and thus no further explanation is given in this regard in connection with the voltage-type resonant converter embodiments. Zero-crossing detection for current-type resonant converters tends to be more involved, several embodiments of which are described in more detail next in connection with FIGS. 11-13.

Figure 11:
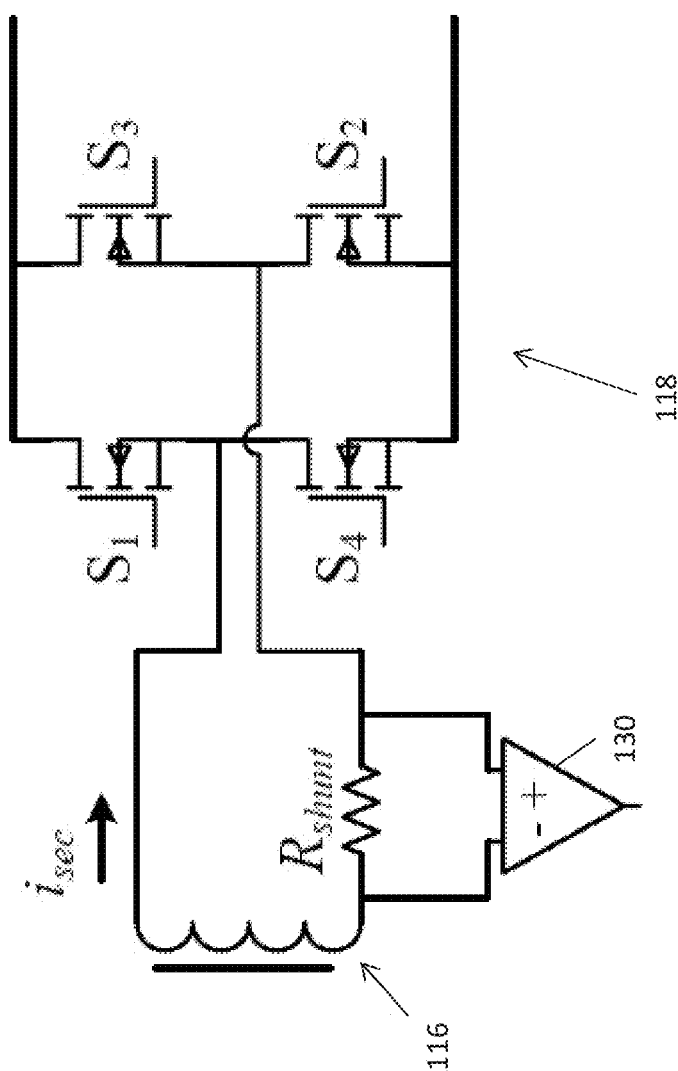
FIG. 11 illustrates a block diagram of an embodiment of a zero-crossing detection circuit for use with a current-type resonant converter having a single rectification and regulation stage.

FIG. 11 illustrates one embodiment of a zero-crossing detection circuit for use with the current-type resonant converters described herein. According to this embodiment, a shunt resistor ($R_{shunt}$) is placed in the current path and the voltage across the shunt resistor is measured by a comparator 130 to determine zero-crossings in $i_{sec}$.

Figure 12:
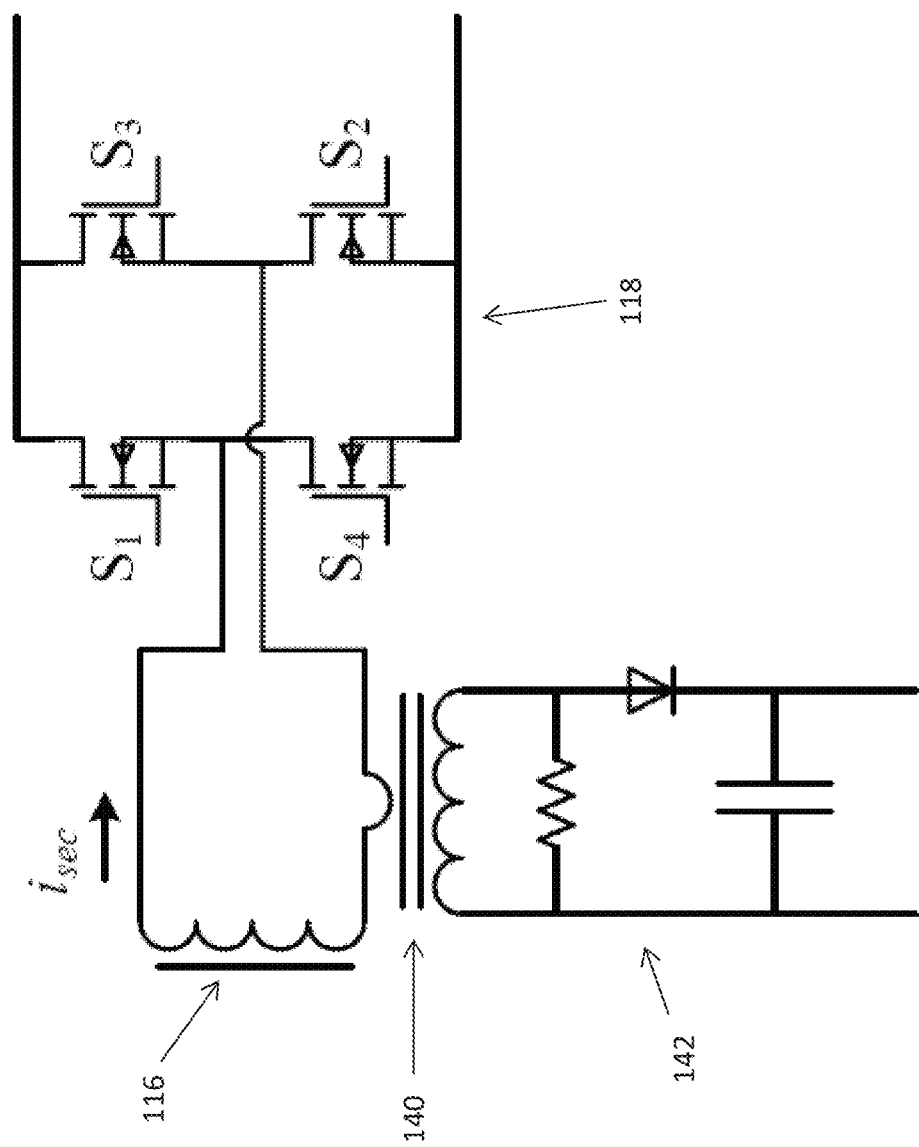
FIG. 12 illustrates a block diagram of another embodiment of a zero-crossing detection circuit for use with a current-type resonant converter having a single rectification and regulation stage.

FIG. 12 illustrates another embodiment of a zero-crossing detection circuit for use with the current-type resonant converters described herein. According to this embodiment, a current transformer (or multiple current transformers) 140 is placed in the current path for determining zero-crossings in $i_{sec}$ using a sense network 142. More than one current transformer can be used to generate a complete sine wave. Alternatively, one current transformer can be used to measure a half-cycle and then the second half-cycle can be predicated or calculated.

Figure 13:
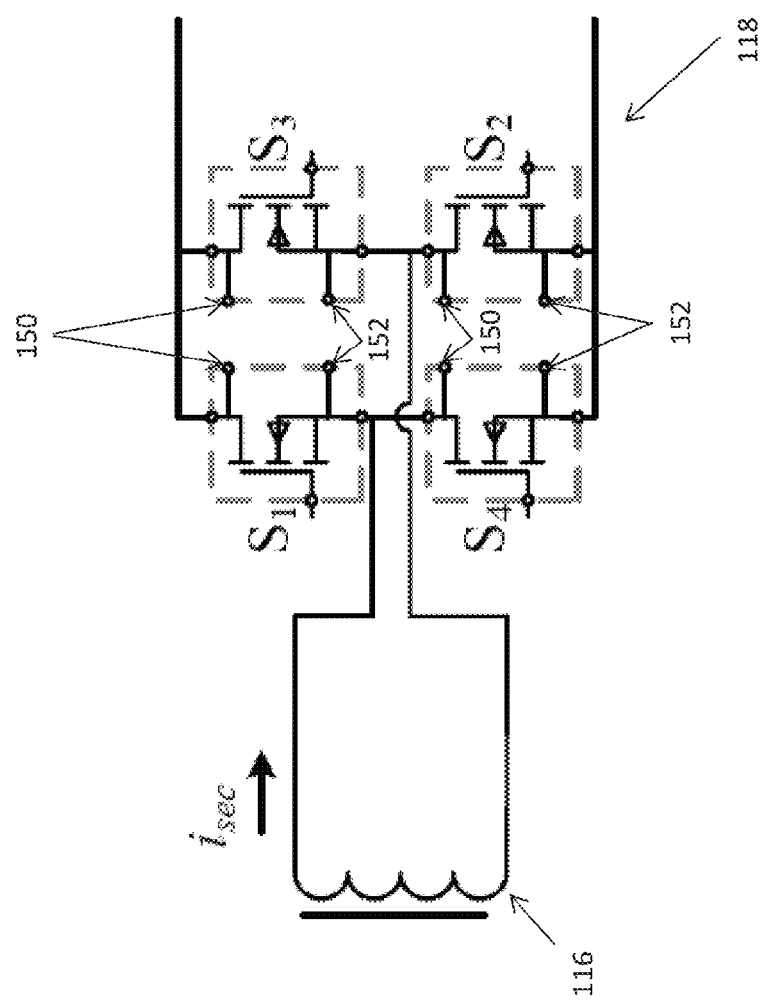
FIG. 13 illustrates a block diagram of yet another embodiment of a zero-crossing detection circuit for use with a current-type resonant converter having a single rectification and regulation stage.

FIG. 13 illustrates yet another embodiment of a zero-crossing detection circuit for use with the current-type resonant converters described herein. According to this embodiment, two or more of the rectifier transistors $S_1$, $S_2$, $S_3$, $S_4$ have two extra terminals 150, 152 that output a signal related to the current through the respective rectifier transistors. For example, the two extra terminals 150, 152 can be for current mirrors, current-controlled voltage sources or voltage-controlled voltage sources. Minimally one rectifier transistor in each pair of controllable rectifiers should be able to supply the current information for a complete resonant cycle. However, like the current transformer embodiment of FIG. 12, if only one rectifier transistor can provide this information, then only half a cycle is known and the second half cycle can be predicted/calculated.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A secondary-side rectification and regulation circuit, comprising:
   a secondary-side transformer winding;
   a full-wave rectifier having a first pair of controllable rectifiers comprising a first transistor connected to a first terminal of the secondary-side transformer winding and a second transistor connected to a second terminal of the secondary-side transformer winding; and
   a control unit operable to control switching of the transistors of the full-wave rectifier so that the full-wave rectifier (a) generates a rectified output for supplying a load by rectifying current through the secondary-side transformer winding or voltage across the secondary-side transformer winding and (b) regulates the rectified output,
   wherein the control unit is operable to control the switching of the first transistor based on a trailing-edge PWM (pulse width modulation) signal synced to a resonant current or voltage waveform for the secondary-side transformer winding, and control the switching of the second transistor based on a leading-edge PWM signal synced to the resonant current or voltage waveform.

2. The secondary-side rectification and regulation circuit of claim 1, wherein the full-wave rectifier has a second pair of controllable rectifiers comprising a third transistor connected to the second terminal of the secondary-side transformer winding and a fourth transistor connected to the first terminal of the secondary-side transformer winding.

3. The secondary-side rectification and regulation circuit of claim 2, wherein the control unit is operable to control switching of the third transistor based on the trailing-edge PWM signal and control switching of the fourth transistor based on the leading-edge PWM signal, the trailing-edge PWM signal and the leading-edge PWM signal each going to zero at zero-crossing points of the resonant current or voltage waveform.

4. The secondary-side rectification and regulation circuit of claim 3, wherein the control unit is operable to turn off the first transistor if the first transistor is on or turn off the third transistor if the third transistor is on responsive to the trailing-edge PWM signal rising above an error signal, and wherein the control unit is operable to turn on the second transistor if the second transistor is off or turn on the fourth transistor if the fourth transistor is off responsive to the leading-edge PWM signal falling below the error signal.

5. The secondary-side rectification and regulation circuit of claim 2, wherein the control unit is operable to control switching of the transistors of each pair of controllable rectifiers in a complimentary manner with 50% duty cycle to rectify the current through the secondary-side transformer winding or the voltage across the secondary-side transformer winding, and wherein the control unit is operable to introduce a phase shift between the pairs of controllable rectifiers to regulate the rectified output.

6. The secondary-side rectification and regulation circuit of claim 5, wherein the control unit is operable to use trailing-edge modulation or leading-edge modulation for further controlling switching of the second and third transistors to introduce the phase shift between the pairs of controllable rectifiers.

7. The secondary-side rectification and regulation circuit of claim 5, wherein the control unit is operable to use trailing-edge modulation for further controlling switching of the first and fourth transistors and leading-edge modulation for further controlling switching of the second and third transistors to introduce the phase shift between the pairs of controllable rectifiers.

8. The secondary-side rectification and regulation circuit of claim 1, wherein the full-wave rectifier has only the first pair of controllable rectifiers and a center tap between the first and second terminals of the secondary-side transformer winding.

9. The secondary-side rectification and regulation circuit of claim 8, wherein the trailing-edge PWM signal and the leading-edge PWM signal each go to zero at zero-crossing points of the resonant waveform.

10. The secondary-side rectification and regulation circuit of claim 9, wherein the control unit is operable to turn off the first transistor if the first transistor is on responsive to the trailing-edge PWM signal rising above an error signal, and wherein the control unit is operable to turn on the second transistor if the first and second transistors are off responsive to the leading-edge PWM signal falling below the error signal.

11. A method of rectification and regulation using a circuit including a full-wave rectifier having a first pair of controllable rectifiers comprising a first transistor connected to a first terminal of a secondary-side transformer winding and a second transistor connected to a second terminal of the secondary-side transformer winding, the method comprising:
switching the transistors of the full-wave rectifier so that the full-wave rectifier generates a rectified output for supplying a load by rectifying current through the secondary-side transformer winding or voltage across the secondary-side transformer winding; and
switching the transistors of the full-wave rectifier to regulate the rectified output,
wherein the first transistor is switched based on a trailing-edge PWM (pulse width modulation) signal synced to a resonant current or voltage waveform for the secondary-side transformer winding,
wherein the second transistor is switched based on a leading-edge PWM signal synced to the resonant current or voltage waveform.

12. The method of claim 11, wherein the full-wave rectifier has a second pair of controllable rectifiers comprising a third transistor connected to the second terminal of the secondary-side transformer winding and a fourth transistor connected to the first terminal of the secondary-side transformer winding.

13. The method of claim 12, further comprising:
switching the third transistor based on the trailing-edge PWM signal;
switching the fourth transistor based on the leading-edge PWM signal; and
setting the trailing-edge PWM signal and the leading-edge PWM signal to zero at zero-crossing points of the resonant current or voltage waveform.

14. The method of claim 13, further comprising:
turning off the first transistor if the first transistor is on or turning off the third transistor if the third transistor is on responsive to the trailing-edge PWM signal rising above an error signal; and
turning on the second transistor if the second transistor is off or turning on the fourth transistor if the fourth transistor is off responsive to the leading-edge PWM signal falling below the error signal.

15. The method of claim 12, further comprising:
switching the transistors of each pair of controllable rectifiers in a complimentary manner with 50% duty cycle to rectify the current through the secondary-side transformer winding or the voltage across the secondary-side transformer winding; and
introducing a phase shift between the pairs of controllable rectifiers to regulate the rectified output.

16. The method of claim 15, further comprising:
further controlling switching of the second and third transistors using trailing-edge modulation or leading-edge modulation to introduce the phase shift between the pairs of controllable rectifiers.

17. The method of claim 15, further comprising:
further controlling switching of the first and fourth transistors using trailing-edge modulation and further controlling switching of the second and third transistors using leading-edge modulation to introduce the phase shift between the pairs of controllable rectifiers.

18. The method of claim 11, wherein the full-wave rectifier has only the first pair of controllable rectifiers and a center tap between the first and second terminals of the secondary-side transformer winding, the method further comprising:
setting the trailing-edge PWM signal and the leading-edge PWM signal each to zero at zero-crossing points of the resonant current or voltage waveform.

19. The method of claim 18, further comprising:
turning off the first transistor if the first transistor is on responsive to the trailing-edge PWM signal rising above an error signal; and
turning on the second transistor if the first and second transistors are off responsive to the leading-edge PWM signal falling below the error signal.

20. An electronic system, comprising:
a load;
a secondary-side transformer winding;
a full-wave rectifier coupling the secondary-side transformer winding to the load and comprising a first pair of controllable rectifiers including a first transistor connected to a first terminal of the secondary-side transformer winding and a second transistor connected to a second terminal of the secondary-side transformer winding; and
a control unit operable to control switching of the transistors of the full-wave rectifier so that the full-wave rectifier (a) generates a rectified output for supplying the load by rectifying current through the secondary-side transformer winding or voltage across the secondary-side transformer winding and (b) regulates the rectified output,
wherein the control unit is operable to control the switching of the first transistor based on a trailing-edge PWM (pulse width modulation) signal synced to a resonant current or voltage waveform for the secondary-side transformer winding, and control the switching of the second transistor based on a leading-edge PWM signal synced to the resonant current or voltage waveform.

\* \* \* \* \*